(12) United States Patent
Pas et al.

(10) Patent No.: US 7,445,711 B2
(45) Date of Patent: Nov. 4, 2008

(54) FILTER CARTRIDGE AND AN ASSEMBLY OF A FILTER HOUSING AND AT LEAST ONE SUCH FILTER CARTRIDGE

(75) Inventors: Peter Alexander Josefus Pas, Lengel (NL); Frits Nicolaas Johannes Jacobus Greter, Oosterbeek (NL)

(73) Assignee: Indufil B.V., Duiven (NL)

( * ) Notice: Subject to any disclaimer, the term of this patent is extended or adjusted under 35 U.S.C. 154(b) by 731 days.

(21) Appl. No.: 10/532,410

(22) PCT Filed: Oct. 23, 2003

(86) PCT No.: PCT/NL03/00717

§ 371 (c)(1),
(2), (4) Date: Apr. 22, 2005

(87) PCT Pub. No.: WO2004/050212

PCT Pub. Date: Jun. 17, 2004

(65) Prior Publication Data

US 2006/0006110 A1 Jan. 12, 2006

(30) Foreign Application Priority Data

Oct. 23, 2002 (NL) .................................. 1021728

(51) Int. Cl.
*B01D 29/50* (2006.01)
*B01D 29/56* (2006.01)

(52) U.S. Cl. ................ 210/314; 210/304; 210/316; 210/323.1; 210/323.2; 210/335; 210/338; 210/348; 210/417; 210/437; 210/497.01; 210/295

(58) Field of Classification Search ........... 210/295, 210/314, 316, 323.1, 323.2, 335, 348, 417, 210/338, 437, 497.01, 304, 456

See application file for complete search history.

(56) References Cited

U.S. PATENT DOCUMENTS 2,870,914 A 1/1959 Bloch
3,442,390 A 5/1969 Petrucci et al.

FOREIGN PATENT DOCUMENTS

GB 1295777 11/1972

*Primary Examiner*—John Kim
(74) *Attorney, Agent, or Firm*—The Webb Law Firm P.C.

(57) ABSTRACT

The invention relates to an assembly with a filter housing and at least one filter cartridge. The at least one filter cartridge is tubular, has a tube wall provided with a filter and comprises a central discharge channel with a discharge connection for discharge of filtered medium. The tube wall has a filter through which the medium to be filtered is able to flow transversely to the tube wall. The filter housing has a filter chamber, surrounded by a side wall, in which the at least one filter cartridge is accommodated with the longitudinal direction parallel to the side wall. The invention furthermore is directed to a filter cartridge intended for such an assembly.

26 Claims, 4 Drawing Sheets

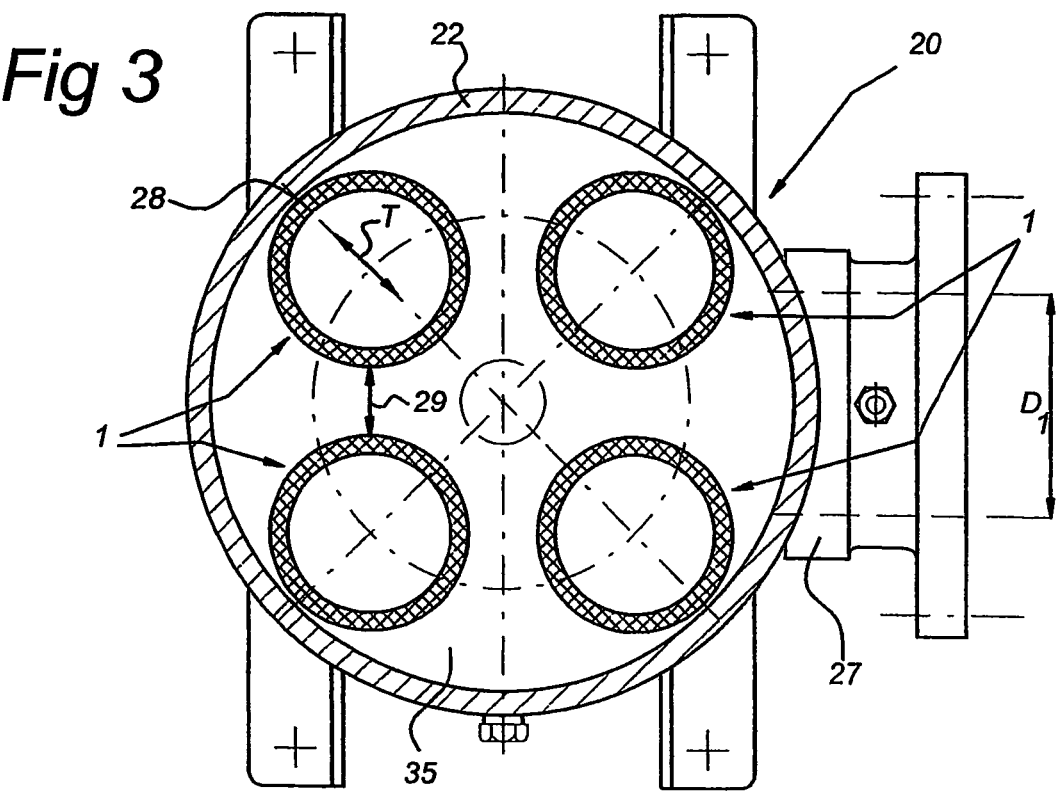
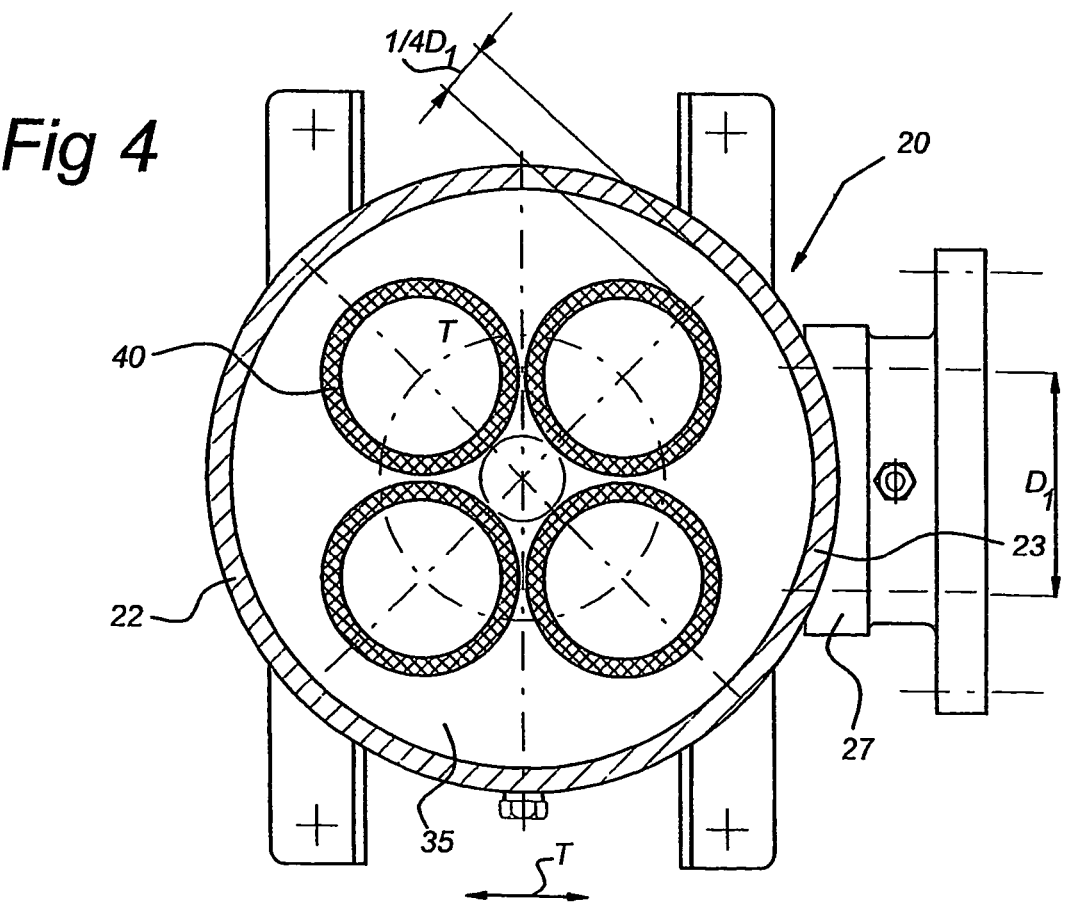

FILTER CARTRIDGE AND AN ASSEMBLY OF A FILTER HOUSING AND AT LEAST ONE SUCH FILTER CARTRIDGE

BACKGROUND OF THE INVENTION

1. Field of the Invention

The present invention relates to an assembly comprising a filter housing and at least one filter cartridge that is tubular, has a tube wall and a central discharge channel with a discharge connection for discharging filtered medium, wherein the tube wall comprises filter means through which medium to be filtered is able to flow transversely to the tube wall;

wherein the filter housing comprises a filter chamber surrounded by a side wall, in which the at least one filter cartridge is accommodated with the longitudinal direction parallel to the side wall;

wherein the filter chamber has at least one outlet per filter cartridge to which the discharge connection of the respective filter cartridge is connected;

wherein the side wall of the filter chamber is provided with at least one inlet for feeding in the medium to be filtered, which inlet pens into the filter chamber at a level that is traversed by the at least one filter cartridge.

With this arrangement the inlet via which medium to be filtered enters the filter chamber is oriented in the transverse direction of the filter cartridges located in the filter chamber, i.e. the direction of flow of the medium to be filtered is initially transverse to the longitudinal direction of the filter cartridges.

2. Description of the Related Art

To ensure rapid distribution of incoming medium to be filtered over the filter chamber, the rule of thumb adopted in this case is that the distance from the filter cartridges to the interior of the side wall of the filter chamber must be at least a quarter of the diameter of the inlet. If there are several filter cartridges present in the filter housing, this minimum distance of a quarter of the diameter of the inlet is usually also adopted for the minimum lateral distance between the filter cartridges. The result of the various aspects is that the dimensions of the filter housing are relatively large.

The aim of the present invention is to be able to make the filter housing of compact construction or, in particular in the case of existing filter housings, to increase the filter capacity and/or to improve the filtration result.

BRIEF SUMMARY OF THE INVENTION

According to the invention the abovementioned aim is achieved in that, viewed in the transverse direction of the filter cartridge and at the level of the inlet, the shortest distance X from the filter cartridge to the side wall is greater than the shortest distance Y from the filter cartridges to the side wall viewed in the transverse direction of the filter cartridge and below or above the inlet. The present invention is based on the insight that the additional space between the wall of the filter housing and the filter cartridge and, respectively, between the filter cartridges themselves, which additional space ensures a good, uniform and rapid distribution of the medium to be filtered over the filter chamber, is not needed in the entire filter housing, but that it suffices to provide this additional space essentially at the level of the inlet. This is because, as the Applicant has found, as soon as the filter medium has distributed over the cross-section of the filter chamber, the additional space between the wall of the filter chamber and the cartridges, and between the cartridges themselves, is no longer needed, or at least is not needed to the same degree as at the location of the inlet.

According to an advantageous embodiment, as the Applicant has found by experimentation, it suffices, viewed in the longitudinal direction of the filter cartridge, if the enlargement of the shortest distance from the filter cartridge to the side wall at the level of the inlet extends over a length of approximately the height of the inlet, although this enlargement of the shortest distance can also extend over a greater length.

According to an advantageous embodiment of the invention, X is given by:

$$X \geq \frac{1}{2}\left(\frac{A}{2Q}\right)$$

where A=surface area of inlet
and Q=height of the region with larger shortest distance X.

If $X \geq A/4Q$ a significant proportion of the medium to be filtered is distributed over the filter chamber via the zone with the relatively larger shortest distance X, so that the conventional distance adopted for Y can decrease very appreciably. According to the invention, Y can be reduced to a minimum if X is given by: $X \geq A/2Q$. If the inlet is circular, A can be given by $$A = \frac{\Pi}{4} D_1^2,$$

which in the previous two equations then results in $$X \geq \frac{\Pi D_1}{16} \text{ and } X \geq \frac{\Pi D_1}{8} \text{ for } Q = D_1.$$

According to a further advantageous embodiment of the invention, Y is given by the following relationship:

$A < B(Y)$, preferably $A \leq 2B(Y)$ where:
A=surface area of inlet
B(Y)=as a function of Y, the surface area of the internal cross-section of the filter housing minus the sum of the cross-sectional surface areas of the filter cartridges at a level above or below the inlet.

In this way it is possible to design the free space available for guiding the medium to be filtered away in the axial direction of the filter cartridge as a minimum, which again enables a reduction in the dimensions of the filter housing or, optionally, enlargement of the filter. In the case of a single cylindrical filter cartridge arranged centrally in a cylindrical filter housing, these equations become $$A < \frac{2\Pi}{4}(D_3^2 - D_2^2), \text{ in particular } A < \frac{\Pi}{4}(D_3^2 - D_2^2)$$

where
A=surface area of inlet
$D_3$=internal diameter of filter housing $D_2$=external diameter of filter cartridge, and
$D_3-D_2=Y$.

If the inlet is circular with diameter $D_1$, it has been found according to the invention that Y can be taken as $$Y < 0.75 \frac{D_1}{4}$$

without any problem, which immediately yields 25% or more reduction compared with the value for Y according to the state of the art However, according to the invention it has been found that Y can also safely be taken as $$Y < 0.4 \frac{D_1}{4},$$

which signifies 60% or more reduction compared with the state of the art. One can, according to the invention usually take $$Y < 0.15 \frac{D_1}{4}$$

without any problem, which thus signifies a reduction of more than 85% in Y compared with the state of the art. Even reductions of more than 95% in Y can be achieved.

If the filter housing is cylindrical with internal diameter $D_3$ and a centrally arranged cylindrical filter cartridge of diameter $D_2$ is assumed and it is realised that $D_3-D_2=Y$, the minimum value for Y for a circular inlet of diameter $D_1$ can be calculated from $D_1{}^2=2(D_3{}^2-D_2{}^2)$. According to the invention, this design value for Y can very readily be maintained as a minimum value for all designs, provided that $D_3$ is the diameter of a circle having a surface area equivalent to the internal cross-sectional surface area of the filter housing mid $D_1$ is a correspondingly equivalent diameter for the inlet surface area and, for simplicity, a central cylindrical filter cartridge is assumed for the purposes of the calculations. It is then possible to take several filter cartridges instead of just one and to continue to use the value for Y calculated for a single filter cartridge.

In the general sense, it is pointed out that wherever a certain diameter of a circular shape is assumed, it is equally well possible to convert a non-circular surface to a circular surface of specific diameter.

So that the filtered medium can also be discharged reliably and well without stagnation of the feed it is highly preferable if A is taken as:

A≦sum of the internal cross-sectional surface areas of the filter cartridges.

It is pointed out that in particular in the case of several filter cartridges which, as a consequence of, for example, their shaping, such as a cylindrical shape, inherently leave a gap between them in the transverse direction, it is even conceivable that the filter cartridges locally come into contact with the wall of the filter chamber. This will, however, result in some loss of available filter surface. However, the design criteria from the state of the art did not permit this.

According to a further embodiment of the invention, it is advantageous if the enlargement of the shortest distance from the filter cartridge to the side wall at the level of the inlet has been obtained by constriction of the tube wall of the filter cartridge at that level. This is practical in order to be able to convert existing filter installations to an assembly according to the invention without adapting the filter housing. For this purpose it is then necessary only to adapt the filter cartridge, which already has to be replaced from time to time.

However, depending on the circumstances, according to the invention it is possibly also highly advantageous if the enlargement of the shortest distance from the filter cartridge to the side wall at the level of the inlet is obtained by making the side wall recessed at that level. In this case it is then not so much the filter cartridge that is adapted as the inward-facing section of the side wall of the filter chamber.

As will be clear, it is also conceivable according to the invention to obtain the enlargement of the shortest distance from the filter cartridge to the side wall at the level of the inlet by both a constriction of the tube wall of the filter cartridge at that level and by making the side wall of the filter chamber recessed at that level.

Making the wall of the filter chamber recessed can be useful if the tube wall has insufficient thickness to enable this to be adequately constricted for the desired effect.

According to a further advantageous embodiment of the invention, the tube wall of the filter cartridge is made impermeable to the medium to be filtered and more generally completely closed in the region where the shortest distance from the filter cartridge to the wall has been enlarged. This prevents the medium to be filtered from being forced directly through the wall of the filter cartridge under the influence of the pressure at which it is fed to the filter chamber, which would have an adverse effect on the filter result.

According to an advantageous embodiment of the invention, the assembly comprises 3, 4 or more of said filter cartridges, which are arranged next to one another, parallel to one another.

According to the further advantageous embodiment, the level of the inlet is located in the legion from 25% to 75% of the length of the filter cartridge.

So that the assembly according to the invention can be used to filter a fluid, it is preferable according to the invention if the filter means are equipped to filter a medium in fluid form.

So that the assembly according to the invention can be used to filter a gas, it is preferable if the filter means are equipped to filter a gaseous medium.

According to a further advantageous embodiment of the invention, the filter cartridge is made as a fine filter on the one side of the inlet and as a coarse filter on the other side. The terms fine filter and coarse filter are used here as relative with respect to one another, which amounts to the fine filter retaining both the particles retained by the coarse filter and also smaller particles. Preferably, the fine filter is at least 5 times finer tan the coarse filter, for example the fine filter allows particles up to 3 µm through and the coarse filter allows particles up to 25 µm through, which means that the fine filter is approximately 8.3 times as fine as the coarse filter.

According to a further aspect, the invention relates to a filter cartridge intended for an assembly according to the invention. More specifically, according to the further aspect, the invention relates to the filter cartridge as defined in the assembly according to the invention.

According to yet a further aspect, the invention relates to a diesel engine provided with a fuel filter or lubricant filter comprising an assembly or a filter cartridge according to the invention.

BRIEF DESCRIPTION OF THE DRAWINGS

The present invention will be explained in more detail below with reference to illustrative embodiments shown in the drawings. In the drawings:

FIG. 3 shows a diagrammatic cross-sectional view according to the lines III-III from FIG. 2;

FIG. 4 shows across-sectional view corresponding to FIG. 3 of an assembly according to the state of the art.

DETAILED DESCRIPTION OF THE INVENTION

Figure 1:
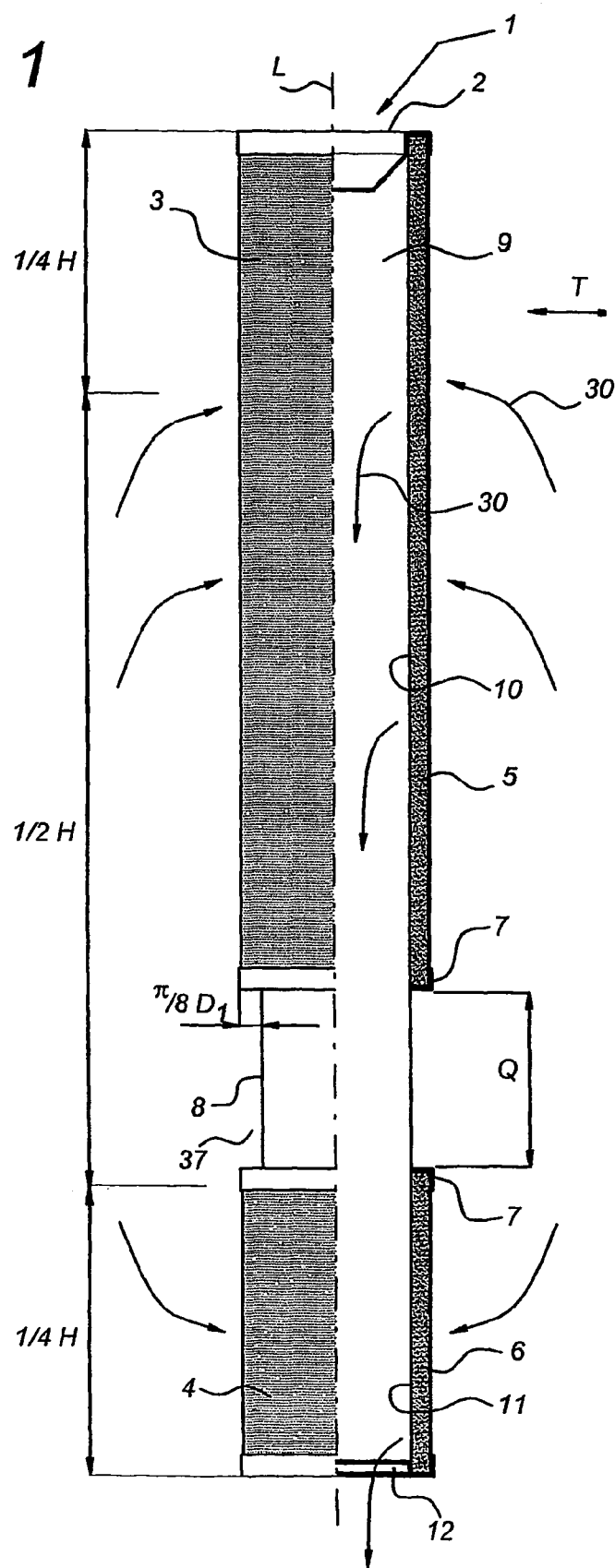
FIG. 1 shows, diagrammatically, a filter cartridge according to the invention, the left-hand half as a front view and the right-hand half in cross-section.

FIG. 1 shows a filter cartridge 1 according to the invention. This filter cartridge 1 is tubular and except for the constriction 37 of the tube wall essentially does not differ from conventional filter cartridges. The filter cartridge 1 is tubular, has a top closure 2 and a discharge connection 12 at the bottom. The filter cartridge has an inner wall 8, 10, 11, which is closed and impermeable at the location of 8 and is permeable to the medium to be filtered at the location of 10 and 11. The filter cartridge furthermore has an outer wall 3 and 4, and also 8, which simultaneously acts as inner wall and outer wall at the location of the constriction 37. The outer wall 3 and 4 consists of a fine mesh or finely perforated metal sheet. The inner wall 10 and 11 can be constructed correspondingly to the outer wall 3, 4. Filter means 5 are present between the inner wall 10 and outer wall 3 and there are corresponding filter means 6 between the inner wall 11 and outer wall 4. The filter means 5 and 6 can be of a wide variety of diverse types and can, for example, be made up of filter papers finely folded into pleats, the fold lines of the pleats then extending in the longitudinal direction L of the filter cartridge 1. Furthermore, the outer wall 3, 4 and inner wall 10, 11 can also act as filter means. Precisely how the inner wall 10, 11, the outer wall 3, 4 and the filter means 5, 6 are constructed is of minor importance for the filter cartridge according to the invention; specifically this can be carried out in a wide variety of ways provided that the filter cartridge is of the type trough which, as is indicated by means of arrows 30, flow takes place essentially transversely to the longitudinal diction L, with filtering effect. A discharge channel 9 for discharging filtered medium allowed through by the tube wall 3, 4, 5, 6, 10, 11 and 8 (which is impermeable) is provided centrally in the filter cartridge 1. In an advantageous embodiment of the invention provision is made that a portion of the filter cartridge, for example the portion 3 located above the constriction 8, is made as a fine filter and another portion, for example the portion 4 located below the constriction 8, is made as a coarse filter. What is achieved by this means is that a portion of the flow is finely filtered, which improves the overall filter result.

As has been stated, the filter cartridge 1 according to the invention differs from filter cartridges from the state of the art in respect of the constriction 37. The constriction 37 is a zone where the filter means 5, 6 have been omitted and where the outer wall 3, 4 is interrupted and the inner wall 8 is closed. The constriction 37 is delimited at its bottom and top by means of an annular dish 7, which annular dish 7 prevents medium to be filtered from being able to flow into the filter means 5 and 6 via the constriction 37 in the longitudinal direction L of the filter cartridge 1.

The constriction 37 is constricted over a distance of $\Pi/8 \, D_1$, where the distance $D_1$ is the effective diameter of the inlet of the filter housing which is still to be discussed.

Viewed in the longitudinal direction L, the filter cartridge as shown in FIG. 1 has a length H. This length is subdivided into a bottom zone of a ¼H, a top zone with a length of a ¼H and an intermediate zone with a length ½H. According to the invention, the constriction 37 is preferably provided in the intermediate zone with a length of a ½H. This can be, as shown in FIG. 1, at the bottom of said intermediate zone with length a ½, at the top of said zone or also somewhere in between, for example in the middle of said zone.

Figure 2:
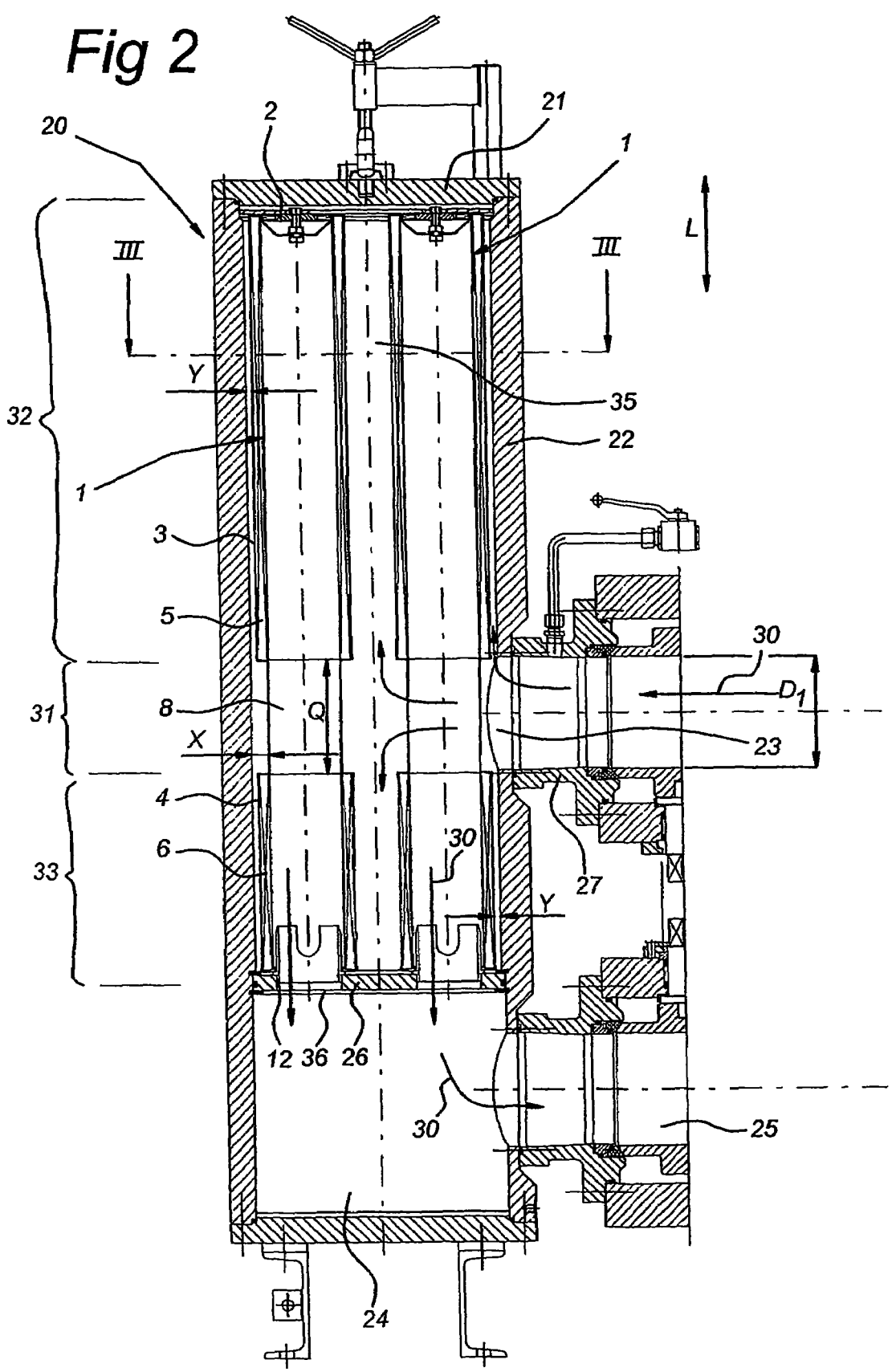
FIG. 2 shows diagrammatic longitudinal sectional view of an assembly according to the invention.

FIG. 2 shows an assembly according to the invention in longitudinal section. A cross-section at the location of the arrows III in FIG. 2 is shown in FIG. 3. With reference to FIGS. 2 and 3, the assembly according to the invention comprises, in accordance with the illustrative embodiment shown, a filter housing 20 with a filter chamber 35, which is delimited by a side wall 22, a top wall 21 and a bottom wall 26 provided with outlets. In the example shown, 4 filter cartridges 1 arranged parallel to one another are provided in the filter chamber 35. These filter cartridges 1 are each connected via a discharge connection 12 to an outlet 36 in the bottom watt 26. Below the bottom wall 26 there is a collection chamber 24 on which a connection stub 25 for discharging filtered medium is fitted. The filter housing 20 is furthermore provided with a connection stub 27 for the feed of medium to be filtered. This connection stub 27 has an inlet 23 with a diameter $D_1$ opening into the filter chamber 35. This diameter $D_1$ corresponds to the length Q of the constriction 37 viewed in the longitudinal direction L.

Before now proceeding with the description of the assembly according to the invention, a comparable conventional assembly will now first be explained in more detail with reference to the cross-section in FIG. 4. This conventional assembly has a filter housing 20 assumed to be essentially identical, which by means of a side wall 22 encloses a filter chamber 35 in which 4 conventional filter cartridges 40 are arranged. These filter cartridges 40 are essentially identical to filter cartridge 1 from FIG. 1, with the understanding that in the case of the filter cartridge 40 the constriction 37 is lacking, that is to say the outer walls 3, 4 are a complete whole and uninterrupted, as are also the filter means 5 and 6 and the inner wall 10, 11, which is still permeable at the location of the constriction. In the case of such conventional assemblies the conventional teaching is that the filter cartridges are so arranged in the filter housing 20 that the smallest distance from the outer wall of the filter cartridge to the inner wall of the filter chamber 35 is at least ¼ $D_1$ (see FIG. 4), where $D_1$ is the diameter of the inlet 23, via which the medium to be filtered flows into the filter chamber 35. As will be clear, this means that, viewed in the cross-sectional direction—perpendicular to longitudinal direction L—the dimensions of the filter housing 20 will be significantly larger than the minimum space required for the filter cartridges 40 for mere accommodation in the filter chamber 35. After all, an additional space of ¼ $D_1$ all round is required to be able to disperse the medium to be filtered through the filter chamber 35 sufficiently quickly.

The Applicant has now arrived at the insight that it surfaces to create the additional space only at the location of the level 31 where the inlet 23 opens into the filter chamber 35.

In accordance with the invention, this requisite additional space could be created by providing the side wall 22 at the location of the level 31 on the inside with a recess of a specific depth in the radial direction of the tube wall 22, which is not shown. However, this means that the tube wall usually has to be made significantly thicker, which will not lead directly to a more compact construction. However, the advantage in this case is that the filter chamber 35 could be filled with more or larger filter elements; after all, the filter elements may even be able to come into contact with the side wall 22. More or larger filter elements lead to a higher filtering capacity and/or to a better filter result. However, according to the invention it is, rather, preferable, optionally as a supplementary measure to the local recessing of the side wall of the filter housing, to provide the filter cartridges 1 with a constriction 37 at the level 31, as has already been discussed with reference to FIG. 1. If the constriction 37 has a depth of approximately $\Pi/8\ D_1$, where $D_1$ is the diameter of the inlet 23, the filter cartridges 1 can then, as is shown in FIG. 3, each have a line of contact 28 with the side wall 22 of the filter housing and, at the same time, have a line of contact or virtually a line of contact with adjacent filter cartridges, in accordance with FIG. 4. That is to say the distance 29 from FIG. 3 can be reduced to approximately 0. The constriction of approximately $\Pi/8\ D_1$ of each filter cartridge can then yield an appreciable reduction in the diameter of the filter housing 20.

It is again pointed out that the diameter of the filter housing in FIG. 3 and the diameter of the filter housing in FIG. 4 have been kept the same as one another and that the diameters of the filter cartridges 1 and 40 have also been kept the same as one another. The reason for this is, in particular, further to clarify the difference between FIGS. 3 and 4 as explained above. It is pointed out that the configuration in FIG. 3 with a mutual spacing of 29 of somewhat less than ¼ D also yields advantages compared with the state of the art as shown in FIG. 4. Specifically, the filtration result is found to be already improved. It will be possible to obtain a major advantage if either the diameter of the filter housing 20 in FIG. 3 is reduced or the diameter of the filter cartridges is increased or optionally an additional, fifth filter cartridge is placed centrally in the filter chamber 35. The filtering capacity increases as a result of increasing the diameter of the filter cartridges 1 or optionally placing an additional, fifth filter cartridge centrally in the middle.

For filter clarification, in FIG. 2 the shortest distance between the filter cartridge 1 and the side wall 22 is also indicated by X at the level of the inlet 23, which level extends over the zone indicated by 31, and this smallest distance is indicated by Y for the zone 32 above zone 31 and also for the zone 33 below zone 31.

Figure 5:
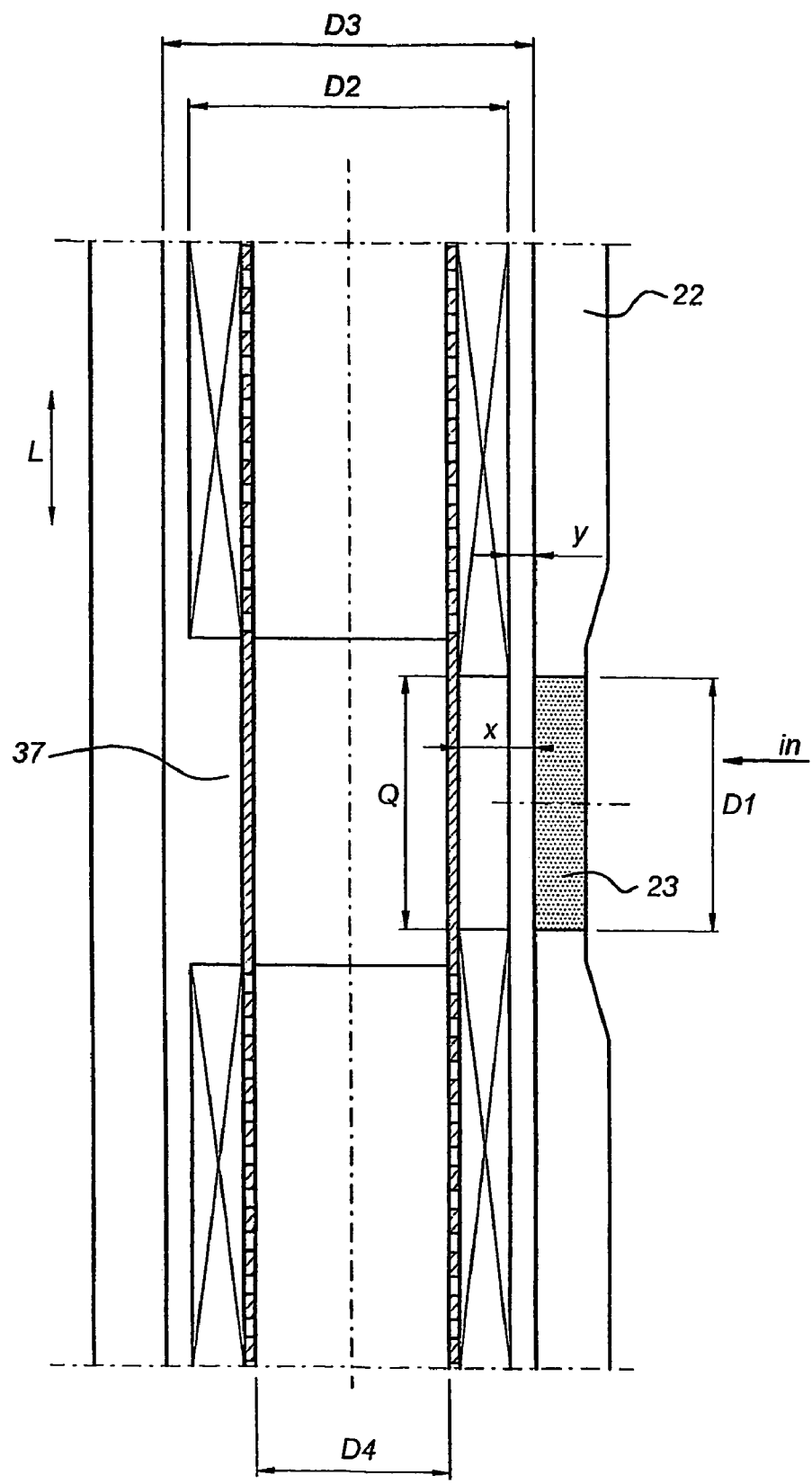
FIG. 5 shows a diagrammatic sketch of the concept of the invention indicating several of the dimensions and variables.

For better understanding, the concept on which the invention is based will be explained in yet more detail with reference to the diagrammatic sketch in FIG. 5:

The surface area A of the inlet 23 can be determined as $$A = \frac{\Pi}{4} D_1^2 \qquad (1)$$

in the case of a circular feed pipe. This equation also applies if the circular feed pipe joins the filter housing at an angle instead of at right angles; after all the point at issue is the effective surface area of the passageway. If the feed pipe is not circular, equation (1) can still be used if the value that yields an equivalent surface area A is taken for $D_1$.

In order to prevent the inflowing medium being retarded when entering the filter housing it is best to ensure that the surface area of the passageway available or flow immediately on entry is equal to or greater than A. The Applicant has reached the insight that the medium can be allowed to flow from the inlet, initially without displacement thereof in the direction L, around the filter cartridge. (The state of the art assumes an immediate deflection of the flow at right angles with respect to the inflow direction indicated by arrow "in").

The surface area available for flow then consists of two rectangular surfaces each with dimensions X×Q. For Q=$D_1$ and a cylindrical filter housing with internal diameter $D_3$ and a centrally arranged cylindrical filter cartridge with constricted diameter $D_4$, this results in $$A = 2(X \times Q) = 2((D_3 - D_4) \times D_1) \qquad (2)$$

$$A = \frac{\Pi}{4} D_1^2 \qquad (1)$$

$$\frac{\Pi}{8} D_1 = (D_3 - D_4) \qquad (3)$$

i.e. $\quad \frac{\Pi}{8} D_1 = X. \qquad (4)$

For further optimisation it is then best to ensure that in the zones above and below the constriction 37 the surface area available for flow, viewed perpendicularly to the longitudinal direction L, is once again at least equal to A. In the illustrative embodiment shown this means that A is equated to 2 annular surfaces each with dimensions $$\frac{\Pi}{4} (D_3^2 - D_2^2)$$

i.e. this gives $$A = 2 \frac{\Pi}{4} (D_3^2 - D_2^2) \qquad (5)$$

$$A = \frac{\Pi}{4} D_1^2 \qquad (1)$$

$$D_3 - D_2 = Y. \qquad (6)$$

For a given $D_1$ and given $D_3$ or $D_2$, Y can then be easily determined. As will be clear, Y can, however, also be determined as a function of $D_1$, without knowing $D_3$ and $D_2$.

This Y value can then be used as minimum value in the design, including in the case of non-circular filter cartridges or multiple filter cartridges. With regard to multiple filter cartridges it is pointed out that Y can then be even further reduced by more accurate calculation.

The invention claimed is:

1. An assembly comprising a filter housing and at least one filter cartridge,
   wherein the at least one filter cartridge is tubular, has a tube wall and a central discharge channel with a discharge connection for discharging filtered medium,
   wherein the tube wall comprises filter means through which medium to be filtered is able to flow transversely to the tube wall;
   wherein the filter housing comprises a filter chamber surrounded by a side wall, in which the at least one filter cartridge is accommodated with the longitudinal direction parallel to the side wall;

wherein the filter chamber has at least one outlet per filter cartridge to which the discharge connection of the respective filter cartridge is connected;

wherein the side wall of the filter chamber is provided with at least one inlet for feeding in the medium to be filtered, which inlet opens into the filter chamber at a level that is traversed by the at least one filter cartridge; and wherein when viewed in the transverse direction of the filter cartridge and at the level of the inlet, the shortest distance (X) from the filter cartridge to the side wall is, viewed in the transverse direction of the filter cartridge and below or above the level of the inlet, greater than the shortest distance (Y) from the filter cartridge to the side wall.

2. The assembly according to claim 1, wherein when viewed in the longitudinal direction of the filter cartridge, the relative enlargement (X minus Y) of the shortest distance from the filter cartridge to the side wall at the level of the inlet extends over a length of approximately the height of the inlet or more.

3. The assembly according to claim 1, wherein the shortest distance X from the filter cartridge to the side wall is defined by the equation:

$$X \geq \frac{1}{2}\left(\frac{A}{2Q}\right)$$

where

A=surface area of inlet, and

Q=height of the region with larger shortest distance X.

4. The assembly according to claim 1, wherein the shortest distance X from the filter cartridge to the side wall is defined by the equation:

$$X \geq \left(\frac{A}{2Q}\right)$$

where

A=surface area of inlet, and

Q=height of the region with larger shortest distance X.

5. The assembly according to claim 3, wherein the inlet is circular with a diameter $D_1$ and wherein the shortest distance X is given by $X \geq \frac{1}{2}$ $$\frac{\Pi D_1}{8}.$$

6. The assembly according to claim 1, wherein A<B(Y), preferably A≦2B(Y)

where:

A=surface area of inlet, and

B=as a function of Y, the surface area of the internal cross-section of the filter housing minus the sum of the cross-sectional surface areas of the filter cartridges at a level above or below the inlet.

7. The assembly according to claim 1, wherein a single cylindrical filter cartridge is provided that is arranged centrally in the cylindrical filter housing, and where:

$$A < \frac{\Pi}{4}(D_3^2 - D_2^2),$$

where

A=surface area of inlet $D_3$=internal diameter of filter housing $D_2$=external diameter of filter cartridge.

8. The assembly according to claim 1, where:

$$Y < \frac{\sqrt{A}}{3.5},$$

where

A=surface area of inlet.

9. The assembly according to claim 1, wherein the inlet is circular with diameter $D_1$; and where $$Y < 0.75\left(\frac{D_1}{4}\right).$$

10. The assembly according to claim 1, wherein the filter housing is cylindrical with internal diameter $D_3$ and, at least conceptually for the purposes of the design, contains a single centrally arranged cylindrical filter cartridge and wherein the inlet is circular with diameter $D_1$, or at least has a surface area that is equal to a circular surface of diameter $D_1$, and wherein the following applies for the diameter $D_2$ of the filter cartridge, $D_3$ and $D_1$: $D_1^2=2(D_3^2-D_2^2)$.

11. The assembly according to claim 1, wherein:

A is less than or equal to the sum of the internal cross-sectional surface areas of the filter cartridges, where A=surface area of inlet.

12. The assembly according to claim 1, wherein the enlargement (X minus Y) of the shortest distance from the filter cartridge to the side wall at the level of the inlet has been obtained by constriction of the tube wall at that level.

13. The assembly according to claim 1, wherein the enlargement (X minus Y) of the shortest distance from the filter cartridge to the side wall at the level of the inlet has been obtained by making the side wall recessed at that level.

14. The assembly according to claim 1, wherein the tube wall is impermeable to the medium to be filtered in the region where the shortest distance from the filter cartridge to the wall has been enlarged.

15. The assembly according to claim 1, wherein the assembly comprises 3, 4 or more of said filter cartridges, which are arranged next to one another, parallel to one another.

16. The assembly according to claim 1, wherein the level of the inlet is located in the region from 25% to 75% of the length of the filter cartridge.

17. The assembly according to claim 1, wherein the filter means are equipped to filter a medium in the form of a fluid.

18. The assembly according to claim 1, wherein the filter means are equipped to filter a gaseous medium.

19. The assembly according to claim 1, wherein the filter cartridge is made as a fine filter on the one side of the inlet and is made as a coarse filter on the other side.

20. The assembly according to claim 19, wherein the fine filter is at least 5 times finer than the coarse filter.

21. A filter cartridge intended for use with a filter housing, wherein the filter cartridge is tubular, has a tubular wall and a central discharge channel with a discharge connection for discharging filtered medium, wherein the tube wall comprises filter means through which medium to be filtered is able to flow transversely to the tube wall;
- wherein the filter housing comprises a filter chamber surrounded by a side wall, in which the at least one filter cartridge is accommodated with the longitudinal direction parallel to the side wall;
- wherein the filter chamber has at least one outlet per filter cartridge to which the discharge connection of the respective filter cartridge is connected;
- wherein the side wall of the filter chamber is provided with at least one inlet for feeding in the medium to be filtered, which inlet opens into the filter chamber at a level that is traversed by the at least one filter cartridge; and
- wherein when viewed in the transverse direction of the filter cartridge and at the level of the inlet, the shortest distance (X) from the filter cartridge to the side wall is, viewed in the transverse direction of the filter cartridge and below or above the level of the inlet, greater than the shortest distance (Y) from the filter cartridge to the side wall.

22. A diesel engine provided with a fuel filter comprising a filter cartridge, wherein the filter cartridge is tubular, has a tubular wall and a central discharge channel with a discharge connection for discharging filtered medium, wherein the tube wall comprises filter means through which medium to be filtered is able to flow transversely to the tube wall;
- wherein the filter housing comprises a filter chamber surrounded by a side wall, in which the at least one filter cartridge is accommodated with the longitudinal direction parallel to the side wall;
- wherein the filter chamber has at least one outlet per filter cartridge to which the discharge connection of the respective filter cartridge is connected;
- wherein the side wall of the filter chamber is provided with at least one inlet for feeding in the medium to be filtered, which inlet opens into the filter chamber at a level that is traversed by the at least one filter cartridge; and
- wherein when viewed in the transverse direction of the filter cartridge and at the level of the inlet, the shortest distance (X) from the filter cartridge to the side wall is, viewed in the transverse direction of the filter cartridge and below or above the level of the inlet, greater than the shortest distance (Y) from the filter cartridge to the side wall.

23. The assembly according to claim 3, wherein the inlet is circular with a diameter $D_1$ and wherein the shortest distance X is given by $X \geq$ $$\frac{\Pi D_1}{8}.$$

24. The assembly according to claim 7, wherein a single cylindrical filter cartridge is provided that is arranged centrally in the cylindrical filter housing, and where:

$$A \leq 2\frac{\Pi}{4}(D_3^2 - D_2^2).$$

25. The assembly according to claim 1, wherein the inlet is circular with diameter $D_1$; and where $$Y < 0.4\left(\frac{D_1}{4}\right).$$

26. The assembly according to claim 1, wherein the inlet is circular with diameter $D_1$; and where $$Y < 0.15\left(\frac{D_1}{4}\right).$$

* * * * *